United States Patent
Montgomery et al.

(10) Patent No.: US 8,593,026 B2
(45) Date of Patent: Nov. 26, 2013

(54) VARIABLE GEAR RATIO MAGNETIC GEARBOX

(75) Inventors: James William Philip Montgomery, Winchester (GB); Huw Llewelyn Edwards, Swansea (GB); Thomas Paul Offord, Felsted (GB)

(73) Assignee: Rolls-Royce PLC, London (GB)

( * ) Notice: Subject to any disclaimer, the term of this patent is extended or adjusted under 35 U.S.C. 154(b) by 197 days.

(21) Appl. No.: 13/055,317

(22) PCT Filed: Jul. 2, 2009

(86) PCT No.: PCT/EP2009/004784
§ 371 (c)(1),
(2), (4) Date: Jun. 28, 2011

(87) PCT Pub. No.: WO2010/015299
PCT Pub. Date: Feb. 11, 2010

(65) Prior Publication Data
US 2011/0253498 A1     Oct. 20, 2011

(30) Foreign Application Priority Data
Aug. 8, 2008   (GB) .................................. 0814399.2

(51) Int. Cl.
*H02K 49/10* (2006.01)
(52) U.S. Cl.
USPC ............................ 310/103; 310/105; 310/266
(58) Field of Classification Search
USPC .................. 310/103, 105, 106, 112–114, 266; 417/420, 423.7
See application file for complete search history.

(56) References Cited

U.S. PATENT DOCUMENTS

| | | | |
|---|---|---|---|
| 3,889,140 A | 6/1975 | Baermann | |
| 5,633,555 A * | 5/1997 | Ackermann et al. | 310/75 D |
| 6,217,298 B1 * | 4/2001 | Klaui | 417/420 |
| 6,710,492 B2 * | 3/2004 | Minagawa | 310/113 |
| 6,774,591 B2 * | 8/2004 | Arimitsu et al. | 318/154 |
| 6,794,781 B2 * | 9/2004 | Razzell et al. | 310/114 |
| 6,903,471 B2 * | 6/2005 | Arimitsu et al. | 310/59 |
| 7,250,702 B2 * | 7/2007 | Abou Akar et al. | 310/114 |
| 7,549,467 B2 * | 6/2009 | McDonald et al. | 166/66.4 |
| 7,791,235 B2 * | 9/2010 | Kern et al. | 310/103 |
| 8,063,526 B2 * | 11/2011 | Bright | 310/103 |
| 8,358,044 B2 * | 1/2013 | Waszak et al. | 310/103 |
| 2004/0108781 A1 | 6/2004 | Razzell et al. | |
| 2007/0107685 A1 * | 5/2007 | Farah | 123/90.31 |
| 2007/0125578 A1 | 6/2007 | McDonald et al. | |

FOREIGN PATENT DOCUMENTS

WO   WO 2007/107691 A1   9/2007
WO   WO 2007/135360 A1   11/2007

OTHER PUBLICATIONS

International Search Report for International Patent Application No. PCT/EP2009/004784, mailed on Oct. 19, 2009.

* cited by examiner

*Primary Examiner* — Tran Nguyen
(74) *Attorney, Agent, or Firm* — Oliff & Berridge, PLC

(57) ABSTRACT

A magnetic gear arrangement is provided comprising a first gear member for generating a first magnetic field and a second gear member for generating a second magnetic field. A coupling element is disposed between the first and second gear members and provides arrangements of interpoles which couple the first and second magnetic fields. The coupling element comprises a plurality of magnetisable lamellae, each interpole in an arrangement of interpoles being formed from a group of neighboring lamellae. Selected lamellae are deactivatable to provide boundaries between adjacent interpoles. This allows different numbers and arrangements of interpoles to be formed, so as to provide different gear ratios between the first and second gear members.

6 Claims, 5 Drawing Sheets

VARIABLE GEAR RATIO MAGNETIC GEARBOX

The present invention relates to magnetic gear arrangements, particularly magnetic gear arrangements having a variable gear ratio.

Gearboxes and gear arrangements are utilised in a wide range of situations in order to couple drive mechanisms. Traditionally, gearboxes have been formed from gear wheels having appropriate teeth numbers and sizes to provide a desired gear ratio. However, such gearboxes have a number of disadvantages. Firstly, they require the use of lubricating oils, which may act as contaminants or fire hazards and may prove ineffective in hot or cold environments, where the oil viscosity varies, or in a low pressure environment, where the oil may evaporate. Furthermore, gearboxes based on gear wheels may be noisy, making them unacceptable for low noise environments such as in hospitals, libraries and residential areas or in clandestine military applications.

More recently, magnetic gearboxes have been provided which comprise respective gear rotors with interpoles between them. The rotors incorporate permanent magnets, and the interpoles, or pole members or elements, act to modulate the magnetic flux transferred between the gear rotors. Such magnetic gearboxes enable a speed-changing mechanical device to be provided in which there is no mechanical contact between input and output shafts, thus avoiding many of the problems of noise and wear that arise in gearboxes having contacting moving parts.

FIG. 1 shows a schematic plan view of a typical magnetic gear arrangement of the prior art. The magnetic gear arrangement 100 is an epicyclic gearbox and comprises an inner rotor 120 and an outer rotor 160. Permanent magnets 140,180 are fixed to the inner and outer rotors 120,160. The permanent magnets 140 affixed to the inner rotor 120 have alternating polarity along the circumference of the rotor. Similarly, the permanent magnets 180 affixed to the outer rotor 160 have alternating polarity along the circumference of that rotor. Typically, one rotor is mechanically coupled to a drive mechanism and the other rotor is mechanically coupled to a driven mechanism.

The inner and outer rotors 120,160 have different numbers of permanent magnets 140,180. Typically, the number of permanent magnets affixed to the outer rotor 160 is greater than that affixed to the inner rotor 120.

Interpoles 200 are provided between the inner rotor 120 and the outer rotor 160 and form an array having a cylindrical shape.

The interpoles 200 modulate the magnetic field produced by the inner rotor 120 and the magnetic field produced by the outer rotor 160, so as to couple the two fields and hence the motion of the rotors. The number of interpoles is a factor in determining the gear ratio of the magnetic gearbox.

The motion of the rotors 120,160 may be either co-rotational or counter-rotational, depending on the number of magnets affixed to each rotor and the number of interpoles.

WO2007/107691 describes a magnetic gearbox arrangement in which coils of electrically-conductive wire are wound around the interpoles. By selectively short-circuiting these coils, the magnetic flux around particular interpoles may be reduced significantly, thus diminishing the modulation capacity of the selected interpoles and effectively removing them from service. Thus, it is possible to change the number and arrangement of active interpoles in the gearbox, in order to modify the gear ratio as required.

Alternatively, a DC current may be passed through the windings around selected interpoles in order to magnetically saturate those interpoles and effectively remove them from service. Again, by changing the number of active interpoles, the gear ratio of the gearbox maybe adjusted to suit the requirements of the application.

In general terms, the present invention may provide a magnetic gear arrangement in which the number of interpoles may be changed while retaining a uniform spacing between adjacent interpoles.

In particular, a first aspect of the invention may provide a magnetic gear arrangement comprising:

a first gear member for generating a first magnetic field, a second gear member for generating a second magnetic field, and a coupling element which provides arrangements of interpoles between the first gear member and the second gear member, the interpoles coupling the first and second magnetic fields;

wherein the coupling element comprises a plurality of magnetisable lamellae, each interpole in an arrangement of interpoles being formed from a group of neighbouring lamellae, and selected of the lamellae being deactivatable so that different numbers and arrangements of interpoles can be formed, the different numbers and arrangements of interpoles producing different gear ratios between the first and second gear members.

By providing interpoles that are effectively superstructures comprising groups of selected lamellae, a gear arrangement is provided in which the number of interpoles may be varied easily and over a wide range. Thus a wide range of gear ratios may be achieved.

Furthermore, the structure of the coupling element allows the number of interpoles to be changed while retaining an even spacing between neighbouring interpoles. It has been found that evenly-spaced interpoles promote efficient coupling of the motion of the first and second gear members.

Individual lamellae may be deactivated by separating them from neighbouring lamellae i.e. by increasing their distance from the coupling element. In this case, the individual lamellae are returnably removable from the coupling element.

Alternatively, the lamellae may be deactivated through being magnetised by an electromagnetic field generated by control wiring associated with the lamellae. That is, electromagnetic means may be used to magnetise individual lamellae so that their capacity to modulate the magnetic field is reduced. Indeed, individual lamellae may be magnetically saturated by the electromagnetic means so that their capacity to modulate the magnetic field is eliminated.

The wiring may pass through the lamella, so that it becomes magnetised when current is passed through the wiring.

Alternatively the wiring may be wound around the lamella to provide a coil. When the coil is short-circuited, the capacity of the lamella to modulate the magnetic field is reduced. This effect may also be achieved by passing current through the coil.

Each individual lamella preferably has a laminated structure to limit the formation of eddy currents.

Typically, the first and second gear members of the gear arrangement are gear rotors. In this case, the lamellae will be arranged to provide a coupling element having a cylindrical shape.

The lamellae are generally arranged face-to-face in the coupling element. Therefore, in the case of a cylindrical coupling element, the lamellae may be arranged face-to-face around the circumference of the coupling element.

Alternatively, the gear arrangement may provide a linear actuator having a elongate coupling element. In this case, the lamellae will generally be arranged face-to-face along the length of the coupling element.

A second aspect of the invention may provide a magnetic gear arrangement comprising a first gear member for generating a first magnetic field, a second gear member for generating a second magnetic field, and a plurality of interpoles disposed therebetween for coupling the first magnetic field and the second magnetic field to control a gear ratio between the first gear member and the second gear member, wherein one or more of the interpoles is moveable in a direction from or towards a neighbouring interpole to vary the spacing between the neighbouring interpoles.

It has been found that the gear ratio of a magnetic gear arrangement may be varied by varying the spacing between neighbouring interpoles. In this case, it is not necessary to change the total number of interpoles.

Thus, the second aspect of the present invention provides a simple and effective way of varying the gear ratio of a magnetic gear arrangement, without the need to dismantle the gear arrangement to add or remove interpoles.

Typically, each interpole is moveable in a direction towards or away from a neighbouring interpole to vary the spacing between the neighbouring interpoles. This makes it possible to maintain even spacing between interpoles, which is considered to promote effective coupling between the first and second gear members.

Neighbouring interpoles may be operatively connected by a spring element. This configuration allows the operator of the gear arrangement to change the spacing of a plurality of interpoles by moving a single interpole. The spring elements allow the positions of the interpoles to become redistributed in response to the movement of a single interpole.

In general, the magnetic gear arrangement of the second aspect of the invention comprises a retainer for retaining the plurality of interpoles disposed between the first and second gear members.

In this case, the magnetic gear arrangement may further comprise a transfer device for transferring interpoles into and out from the retainer. This transfer device may help to ensure that the plurality of interpoles held by the retainer is always distributed across a substantial portion of the retainer. That is, the transfer device may transfer additional interpoles into the retainer when the spacing between neighbouring interpoles held by the retainer is decreased. Similarly, the transfer device may assist in the removal of interpoles from the retainer when the spacing between neighbouring interpoles held by the retainer is increased.

Effectively, the transfer device may serve to avoid a situation in which the distribution of interpoles in the retainer is concentrated in only one part of the retainer.

By ensuring that interpoles are distributed throughout the retainer, the transfer device may help to ensure efficient coupling of the magnetic fields generated by the first and second gear members.

Typically, the transfer device comprises a feeder tube connected to the retainer. When the spacing between neighbouring interpoles in the retainer is high, the feeder tube may accommodate excess interpoles that are not required by the retainer. Effectively, in this case, the feeder tube acts as a reservoir for excess interpoles. Conversely, when the spacing between neighbouring interpoles in the retainer is low, the feeder tube may transfer additional interpoles into the retainer.

In general, the transfer device is provided in magnetic gear arrangements in which neighbouring interpoles are operatively connected by a spring element. In this case movement of a single interpole has the effect of allowing the interpoles within the retainer to be redistributed and of allowing interpoles to be transferred to or from the retainer as required by the spacing of the new interpole distribution.

Typically, the first and second gear members of the gear arrangement of the second aspect of the invention are gear rotors.

Embodiments of the invention will now be described by way of example with reference to the accompanying drawings in which.

Figure 1:
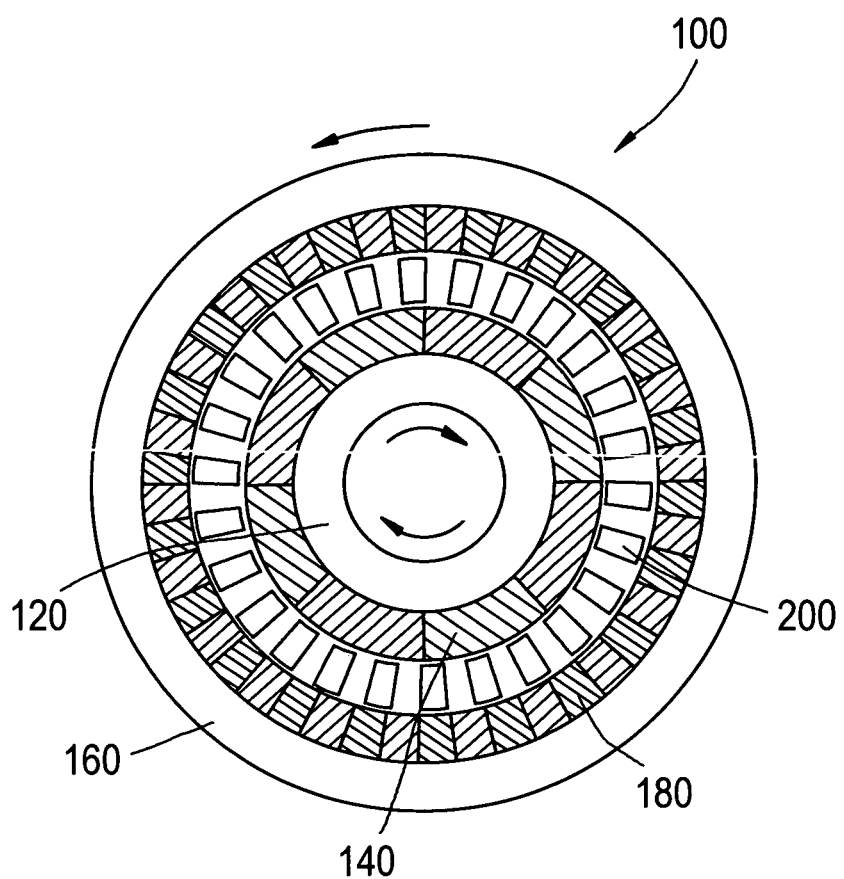
FIG. 1 shows a schematic plan view of a gearbox of the prior art.
Figure 2:
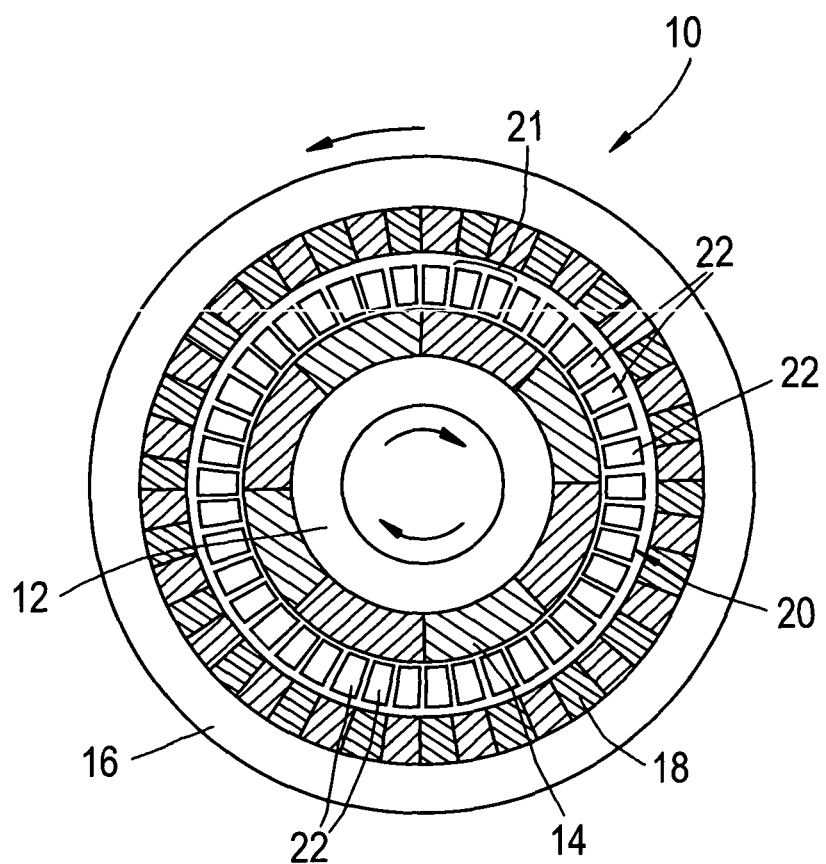
FIG. 2 shows a schematic plan view of an epicyclic gearbox according to a first aspect of the present invention.

FIG. 2 shows a schematic plan view of a magnetic gear arrangement according to a first aspect of the present invention. The magnetic gear arrangement 10 is an epicyclic gearbox and comprises an inner rotor 12 and an outer rotor 16. Permanent magnets 14,18 are fixed to the inner and outer rotors 12,16. The permanent magnets 14 affixed to the inner rotor 12 have alternating polarity along the circumference of the rotor. Similarly, the permanent magnets 18 affixed to the outer rotor 16 have alternating polarity along the circumference of that rotor. Typically, one rotor is mechanically coupled to a drive mechanism and the other rotor is mechanically coupled to a driven mechanism.

The magnetic gearbox may be operated in a co-rotational or a contra-rotational fashion. That is, the inner and outer rotors 12,16 may rotate in the same or opposite directions.

The inner and outer rotors 12,16 have different numbers of permanent magnets 14,18. Typically, the number of permanent magnets affixed to the outer rotor 16 is greater than that affixed to the inner rotor 12.

A coupling element 20 is provided between the inner rotor 12 and the outer rotor 16. This coupling element 20 has a cylindrical shape and includes an array of magnetisable lamellae 22. The lamellae are arranged face-to-face around the circumference of the coupling element. The lamellae 22 are made of a magnetically soft material e.g. electrical steel, and modulate the magnetic field generated by the permanent magnets on the inner and outer rotors 12,16, so as to couple the two fields. The lamellae may have a laminated structure so as to hinder the formation of eddy currents.

Individual lamellae may be deactivated so that their capacity to modulate the magnetic fields is reduced or eliminated. This may be achieved by mechanically separating a single lamella from the array of lamellae. Since this embodiment is an epicyclic gearbox, the lamellae may simply be removed from the array in an axial direction of the gearbox. Removal of the lamellae may be effected, for example, by a solenoid actuator or a unison ring.

Alternatively, individual lamellae may be subjected to electromagnetically-induced effects in order to reduce their capacity to modulate the magnetic field between the inner and outer rotors 12,16. Preferably, in this case, the selected lamellae are magnetically saturated so that they are not capable of actively modulating the magnetic field.

In order to achieve magnetisation of the lamellae, lamellae may be provided with conducting wires passing through them. By applying a voltage across the conducting wire, current is passed along the wire and the lamella is magnetised.

Alternatively, conducting wire may be wound around individual lamellae to form a coil. By short-circuiting the coil, the ability of the each lamella to modulate the magnetic field is reduced considerably. An impedance may be connected to the coil for further modifying the ability of the lamella to modulate the magnetic field.

The deactivated lamellae in the coupling element 20 serve to define discrete groups of active lamellae. Neighbouring lamellae are sufficiently closely spaced that each group of active lamellae provides one interpole, the gear ratio of the magnetic gearbox being dependent on the number and arrangement of these interpoles 21.

Thus, the gear ratio of the gearbox is dependent on the number of groups of active lamellae, rather than the total number of active lamellae.

In effect, the spacing between the lamellae 22 is sufficiently close that adjacent lamellae may modulate the magnetic field generated by the permanent magnets on the inner and outer rotors 12,16 in the same way and as part of the same interpole 21.

By providing a coupling element 20 in which the interpoles 21 may be composite structures comprising a plurality of lamellae, it is possible to vary the number and distribution of the interpoles 21 over a wide range. Since the gear ratio of the magnetic gearbox is partly determined by the number of interpoles 21, this configuration of the coupling element allows that gear ratio to be varied rapidly over a wide range, for example, so as to switch from co-rotational to contra-rotational motion. The gearbox does not need to be dismantled to change the number of interpoles 21. The configuration of the coupling element also allows the number of interpoles 21 to be changed while retaining a uniform spacing between adjacent interpoles 21, so providing a gearbox with a high operational efficiency.

Figure 3A:
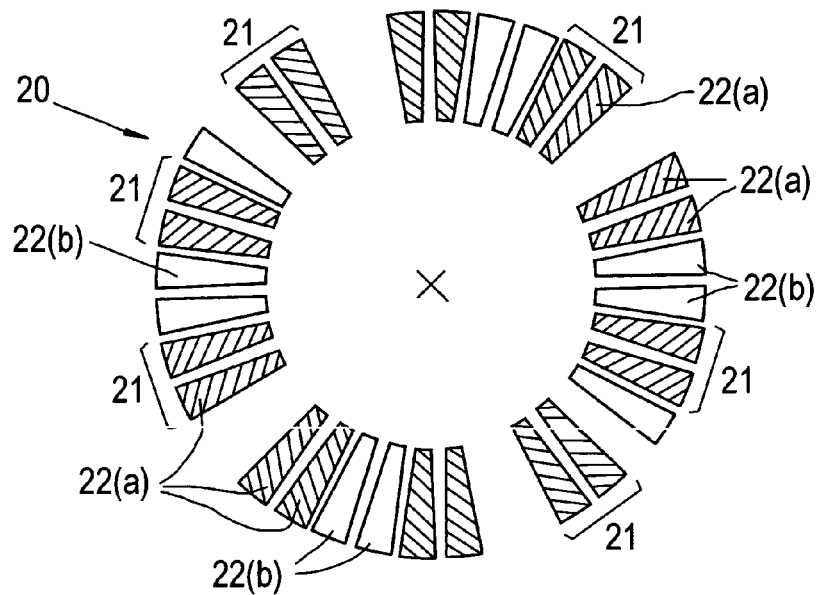
FIG. 3(a) shows a schematic plan view of the coupling element of FIG. 2 showing active and de-activated lamellae.
Figure 3B:
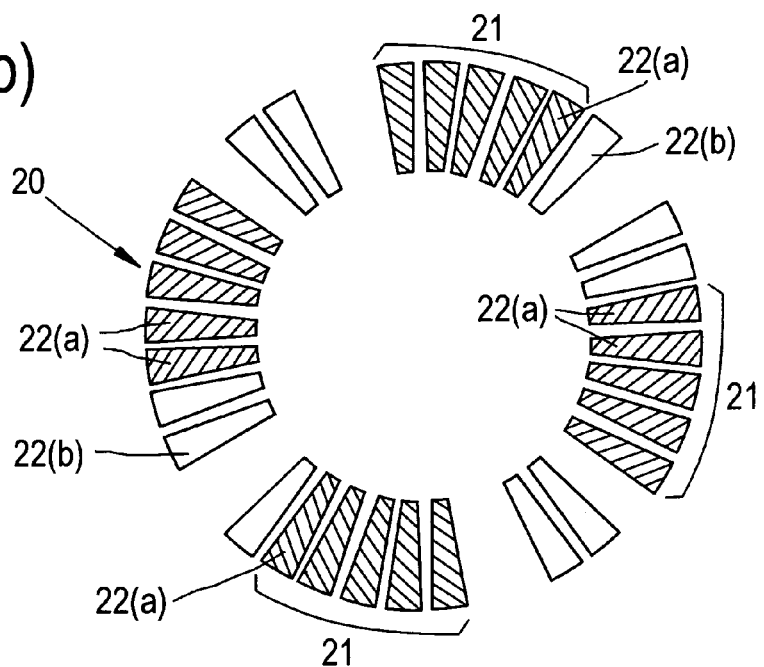
FIG. 3(b) shows a schematic plan view of the coupling element of FIG. 2 showing a different arrangement of active and de-activated lamellae.

FIG. 3 shows a schematic plan view of a coupling element 20 according to a first aspect of the present invention, showing active lamellae 22a and de-activated lamellae 22b. In FIG. 3(a), the de-activated lamellae 22b are so arranged that the coupling element 20 provides ten interpoles 21. In FIG. 3(b), the de-activated lamellae 22b are so arranged that the coupling element 20 provides four interpoles 21. By configuring the coupling element 20 of the magnetic gearbox 10 so that interpoles 21 may comprise a plurality of lamellae 22, the operator of the magnetic gearbox is given a high level of flexibility in deciding the number and position of the interpoles 21.

Each interpole 21 may include two or more active lamellae 22a. Typically, the number of active lamellae comprised within one interpole 21 is greater than two.

Figure 4A:
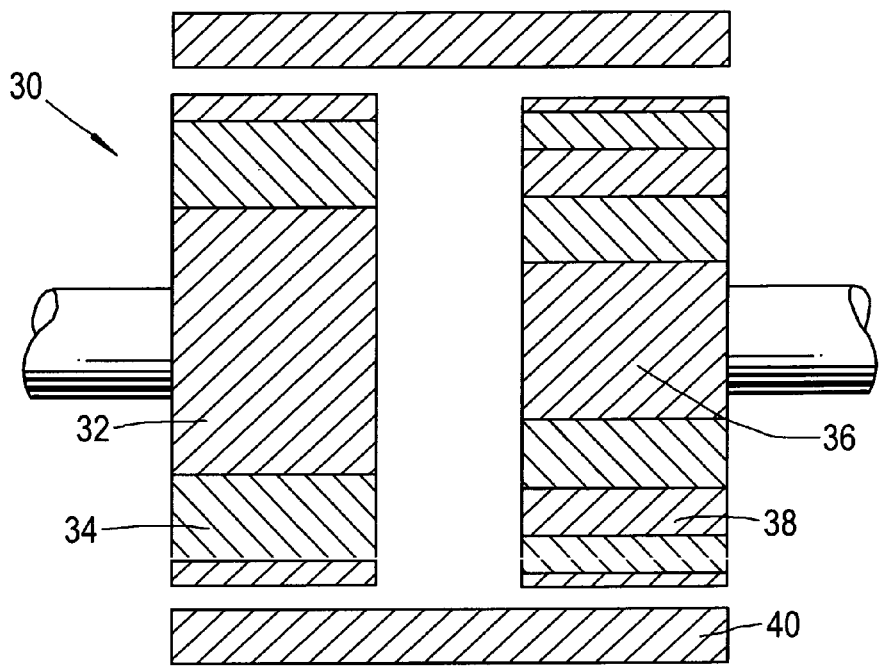
FIG. 4(a) shows a section view of an in-line magnetic gearbox according to a first aspect of the present invention.
Figure 4B:
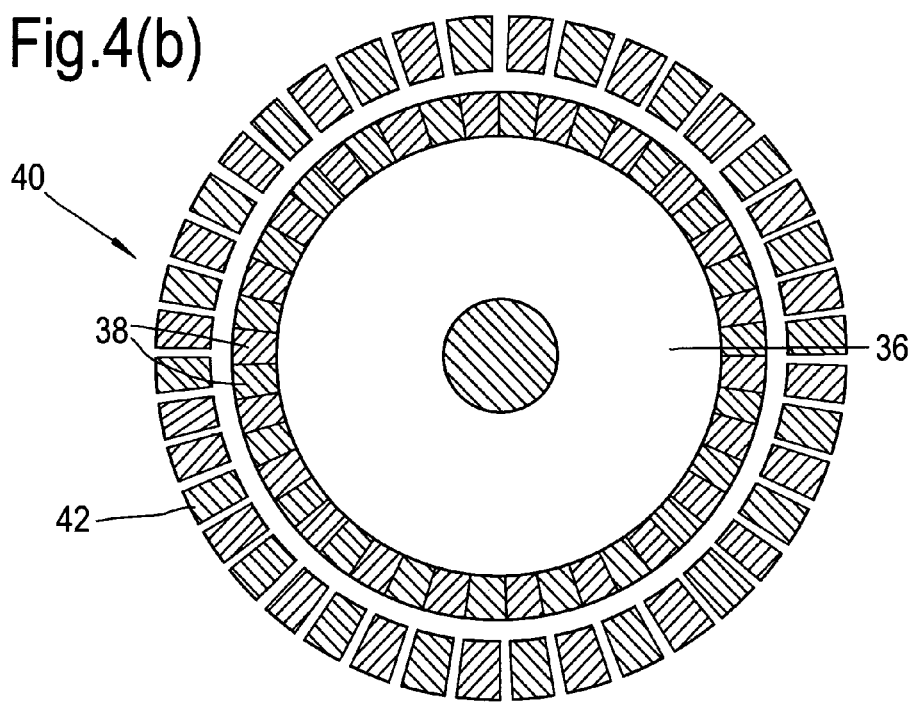
FIG. 4(b) shows a schematic front view of the gearbox of FIG. 4(a) along a longitudinal axis of the gearbox.

FIG. 4 shows a schematic plan view of an in-line magnetic gearbox according to a first aspect of the present invention. FIG. 4(a) shows a side view of the gearbox, while FIG. 4(b) shows two views taken from the front and rear of the gearbox. The magnetic gearbox 30 has a first rotor 32 and a second rotor 36. Permanent magnets 34,38 are affixed to the first rotor 32 and the second rotor 36, respectively.

A coupling element 40 is provided around the first and second rotors 32,36. This coupling element 40 has a cylindrical shape and includes an array of lamellae 42 for modulating the magnetic field generated by the first and second rotors 32,36. Adjacent lamellae 42 may form part of a single interpole 21. Individual lamellae may be deactivated to provide boundaries between adjacent interpoles 21.

In the in-line magnetic gearbox shown in FIG. 4, the first and second rotors 32,36 are positioned inside the cylindrical coupling element 40, each at a respective end of this cylinder. However, the first and second rotors 32,36 may alternatively be positioned outside the cylindrical coupling element 40, each at a respective end of this cylinder.

The principle of providing interpoles that may be built up from an array of lamellae according to the gear ratio required by the operator may also be applied to other configurations of magnetic gearboxes e.g. linear magnetic gearboxes or tubular magnetic gearboxes.

As discussed above, distinct interpoles may be provided in an array of lamellae by deactivating selected lamellae to create a boundary between adjacent interpoles. However, interpoles may also be formed by moving lamellae in the direction of their nearest neighbour so that groups of lamellae are created, each group of lamellae functioning as one interpole.

Figure 5:
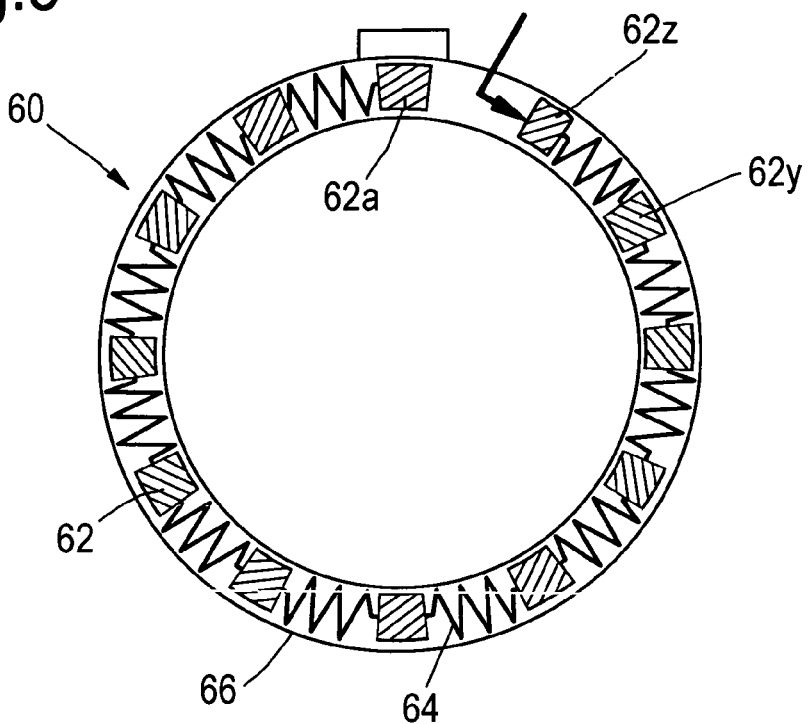
FIG. 5 shows a schematic plan view of a coupling element of a gearbox according to a second aspect of the invention.

FIG. 5 shows the coupling element 60 of a magnetic gear arrangement according to a second aspect of the invention. The gear arrangement may be an epicyclic or an in-line/disc gearbox. The coupling element 60 modulates the magnetic field generated by a first rotor and a second rotor (not shown). The coupling element 60 comprises a plurality of interpoles 62 that are connected by spring elements 64 extending between nearest neighbour interpoles, so as to form a string array. The string array extends from a first interpole 62a to a last interpole 62z. The string array is arranged within a retaining ring 66.

The string array has a fixed end and a free end. The fixed end is provided by the first interpole 62a, which is fixed relative to the retaining ring 66. The free end of the string array is provided by interpole 62z. Interpole 62z is only connected to one interpole i.e. to its nearest neighbour interpole 62y on one side, and its position along the retaining ring may be modified according to the requirements of the application.

The spring elements 64 between nearest neighbour interpoles ensure that the interpoles are equally spaced along the string array regardless of the position of the free end 62z of the string array. The gear ratio of the magnetic gearbox is partly determined by this spacing and so this configuration of the coupling element 60 provides a means of modifying the gear ratio as required. The operator of the gearbox only has to change the position of one component (interpole 62z) in order to change the gear ratio, and so there is no need to dismantle the gearbox or actively rearrange the whole coupling element 60.

In an alternative configuration, the coupling element may comprise a cylindrical array of lamellae, which can each be moved in a circumferential direction to form distinct groups of lamellae, each of which functions as a single interpole. By grouping the lamellae differently, the number of interpoles may be changed and hence the gear ratio modified.

Figure 6:
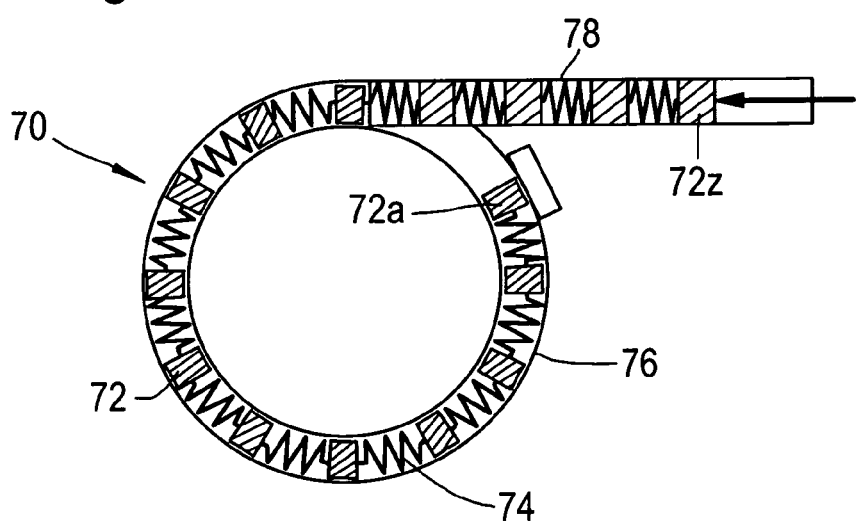
FIG. 6 shows a schematic plan view of a modified coupling element according to a second aspect of the invention.

FIG. 6 shows a modified coupling element 70 of a magnetic gear arrangement according to a second aspect of the invention. The gear arrangement may be an epicyclic or an in-line/disc gearbox. The coupling element 70 comprises a plurality of interpoles 72 that are connected by spring elements 74 extending between nearest neighbour interpoles, so as to form a string array. The spring elements 74 ensure that the interpoles 72 are evenly-spaced along the string array.

The string array extends from a first interpole 72a, whose position is fixed, to a last interpole 72z. The string array is partly disposed within a retaining ring 76, while excess interpoles 72 (including the last interpole 72*z*) that are not able to be accommodated by the retaining ring 76 are held by a feeder tube 78.

The spacing between adjacent interpoles, and thus the gear ratio, may be changed by altering the position of the last interpole 72*z*. Thus, the feeder tube 78 effectively provides a reservoir of interpoles, that allows interpoles to be transferred into or out of the retaining ring as the spacing between nearest neighbour interpoles is varied.

The advantage of this arrangement is that, even though the spacing between nearest neighbour interpoles may vary, interpole members may still be provided along the majority of the circumference of the retaining ring 76. This ensures efficient transfer of power between the two rotors of the gearbox.

This arrangement may be better suited to an in-line/disc gearbox than an epicyclic gearbox, since the retaining ring of the coupling element of an in-line/disc gearbox may be accessed more easily for connecting to a feeder tube.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A magnetic gear arrangement comprising:
   a first gear member for generating a first magnetic field,
   a second gear member for generating a second magnetic field, and
   a coupling element that provides arrangements of interpoles between the first gear member and the second gear member, the interpoles coupling said first and second magnetic fields; wherein
   the coupling element comprises a plurality of magnetisable lamellae, each interpole in an arrangement of interpoles being formed from a group of neighbouring lamellae, and selected of the lamellae being deactivatable through being returnably removable from the coupling element, so that different numbers and arrangements of interpoles can be formed, the different numbers and arrangements of interpoles producing different gear ratios between the first and second gear members.

2. A magnetic gear arrangement comprising a first gear member for generating a first magnetic field, a second gear member for generating a second magnetic field, and a plurality of interpoles disposed therebetween, for coupling said first magnetic field and said second magnetic field to control a gear ratio between said first gear member and said second gear member,
   wherein one or more of said interpoles is moveable in a direction towards or away from a neighbouring interpole to vary the spacing between the neighbouring interpoles.

3. A magnetic gear arrangement according to claim 2, wherein each of said interpoles is moveable in a direction towards or away from a neighbouring interpole to vary the spacing between the neighbouring interpoles.

4. A magnetic gear arrangement according to claim 2, wherein the or each interpole and its neighbouring interpole are operatively connected by a spring element.

5. A magnetic gear arrangement according to claim 1, wherein said first gear member and said second gear member are both gear rotors.

6. A magnetic gear arrangement according to claim 1, wherein the first gear member comprises a plurality of permanent magnets and the second gear member comprises a plurality of permanent magnets.

\* \* \* \* \*